United States Patent Office 3,128,183
Patented Apr. 7, 1964

3,128,183
PHOTOGRAPHIC HALIDE EMULSIONS SENSITIZED WITH ALKYLENE OXIDE POLYMERS AND ALIPHATIC AMINES
Jean E. Jones, Rochester, N.Y., John Sagal, Jr., Mount Prospect, Ill., and Charles V. Wilson, Rochester, N.Y., assignors to Eastman Kodak Company, Rochester, N.Y., a corporation of New Jersey
No Drawing. Filed June 17, 1960, Ser. No. 36,756
10 Claims. (Cl. 96—107)

This invention relates to synergistic combinations of sensitizers for photographic silver halide emulsions.

Photographic silver halide emulsions can be chemically sensitized with a variety of materials in order to increase the speed, and frequently the gamma, as opposed to optical sensitization wherein the range of spectral sensitivity is increased. Some types of chemical sensitization result in the formation of silver sulfide specks in or on the surface of the silver halide crystals, while other types of chemical sensitization may result in the formation of small specks of metallic silver as a result of the reduction of silver halide. Still another type of chemical sensitization results from the treatment of photographic emulsions with the salts of noble metals, such as gold, which may result in the formation of small amounts of noble metals in or on the surface of the silver halide crystal. Still another type of sensitization results from treatment of the silver halide emulsions with derivatives of certain alkylene oxides, such as ethylene oxide. This latter type of speed increase or sensitization is generally not called chemical sensitization, since it has not been possible to detect any chemical interaction between the silver halide crystal and the derivative of the alkylene oxide.

While it is also known that certain long-chain alkyl secondary or tertiary aliphatic amines stabilize photographic silver halide emulsions, while the lower alkylamines function as sensitizers, we have now found that certain aliphatic amines can be used in combination with derivatives of alkylene oxides to obtain a speed increase considerably greater than that obtainable with either compound alone. It has not been possible to detect any chemical interaction between the aliphatic amines useful in practicing our invention and the alkylene oxide derivatives. The reason for the significant synergistic activity taking place between the aliphatic amines and the alkylene oxide derivatives of our invention is, hence, not readily apparent.

The alkylene oxide polymers used to sensitize the emulsions can be of various types. The alkylene oxides from which the polymers are derived contain from 2 to 4 carbon atoms, e.g., ethylene oxide, propylene oxide and butylene oxide. The preparation of polymers from these compounds is described in Ellis, The Chemistry of Synthetic Resins (1935), pages 990 to 994. These compounds are also referred to as polyalkylene glycols and their use as sensitizers for silver halide emulsions is described in U.S. Patents 2,423,549 and 2,441,389. The alkylene oxide derivatives can be prepared by condensing an organic compound containing an active hydrogen atom with an alkylene oxide polymer, or by condensing the active hydrogen compound with the alkylene oxide during the polymerization of the latter material.

Various derivatives of alkylene oxides can also be used to sensitize the emulsions, e.g., condensation products of alkylene oxide with organic compounds containing an active hydrogen atom. Examples of "active hydrogen organic compounds," i.e., compounds in which a hydrogen atom may be replaced by reaction of the compound with metallic sodium, methylmagnesium iodide, etc., include alcohols, amines, mercaptans, acids, amides, hydrocarbons, such as acetylene, and compounds having the active hydrogen in a methylene group such as dibenzoylmethane. More specifically, we can employ condensation products of alkylene oxide with glycols, such as those having from 8 to 18 carbon atoms as described in U.S. Patent 2,240,-472 and British Patent 443,559, as well as condensation products of alkylene oxides with aliphatic alcohols, condensation products of alkylene oxides with aliphatic acids, e.g., lauric acid and glycine, condensation products of alkylene oxides with aliphatic amines or amides, e.g., glycine and lauryl amide, and condensation products of alkylene oxides with phenols, e.g., phenol. The preparation of these condensation products is described in U.S. Patent 1,970,578. Condensation products of alkylene oxides with hexitol ring dehydration products as described in U.S. Patent 2,400,532 can also be employed.

In each case the polyalkylene oxide or derivative of alkylene oxide should have a molecular weight of at least 300. Condensation products of ethylene oxide with long chain alcohols, acids, amines or amides should have a molecular weight of about 700. In general, the best results are obtained with the condensation products of ethylene oxide with long chain compounds having a chain length of 12 or more carbon atoms, and with ethylene oxide polymers having a molecular weight of 1500 to 4000 or more.

When employing optically sensitized emulsions, the optical sensitizing dyes are advantageously employed in about their optimum concentration which ordinarily lies between about 5 mgs. and 100 mgs. of optical sensitizing dye per liter of emulsion containing about 0.25 gram mole of silver halide although concentrations above or below the optimum concentration can be employed.

The alkylene oxide derivatives used to sensitize the emulsions can be illustrated by the following specific examples, although our invention is in no way limited to the use of these specific compounds.

$$HOCH_2CH_2O(CH_2CH_2O)_nCH_2CH_2OH$$

Polyethylene glycol

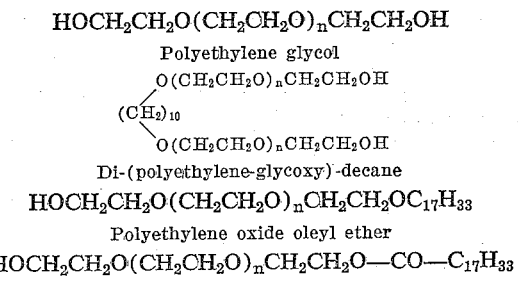

Di-(polyethylene-glycoxy)-decane $$HOCH_2CH_2O(CH_2CH_2O)_nCH_2CH_2OC_{17}H_{33}$$

Polyethylene oxide oleyl ether $$HOCH_2CH_2O(CH_2CH_2O)_nCH_2CH_2O-CO-C_{17}H_{33}$$

Polyethylene oxide oleic ester where $n$=an integer greater than about 10.
Polyethyleneoxide nonyl phenol ether
Polyethylene glycol (Carbowax 1540)-bis-carboglutamic acid
Polyethylene glycol (Carbowax 1540)-bis-butylurethane The aliphatic amines useful in practicing our invention include those which can advantageously be represented by the following general formula:

(I)

wherein R represents an alkyl group containing at least 6 carbon atoms, such as n-hexyl, isohexyl, n-heptyl, n-octyl, isooctyl, t.-octyl, n-nonyl, n-decyl, n-lauryl(dodecyl), n-myristyl, n-pentadecyl, n-cetyl(hexadecyl), eicosanyl, etc., or an alkenyl group containing at least 6 carbon atoms, such as hexenyl, heptenyl, octenyl, octadecenyl, etc., and $R_1$ and $R_2$ each represents a hydrogen atom, an alkyl group (e.g., methyl, ethyl, n-propyl, n-butyl, n-amyl, n-hexyl, n-heptyl, n-octyl, etc.), a hydroxyalkyl group (e.g., β-hydroxyethyl, β-hydroxypropyl, γ- hydroxypropyl, etc.), an alkoxyakyl group (e.g., β-methoxyethyl, β-methoxypropyl, β-ethoxyethyl, etc.), a halogenoalkyl group (e.g., β-chloroethyl, β-bromoethyl, β-chloropropyl, etc.), etc. It has also been found that diamines containing a total of 7 or more carbon atoms can be used synergistically in combination with the alkylene oxide derivatives of our invention. Typical primary, secondary and tertiary amines containing an alkyl group or an alkenyl group of at least 6 carbon atoms include the following:

(1) N-methylmyristylamine
(2) N-methylmyristyl-β-hydroxyethylamine
(3) Cetylamine
(4) Cetyldimethylamine
(5) Methyloctadecen-9-ylamine
(6) Laurylmethylamine
(7) Tri-n-hexylamine
(8) Tri-n-heptylamine
(9) N,N-diethyllaurylamine
(10) N,N-dimethyloctadecylamine
(11) N,N-dimethyllaurylamine
(12) 6-hydroxyhexylamine The photographic emulsions used in practicing our invention are of the developing-out type.

The emulsions can be chemically sensitized by any of the accepted procedures. The emulsions can be digested with naturally active gelatin, or sulfur compounds can be added such as those described in Sheppard U.S. Patent 1,574,944, issued March 2, 1926, Sheppard et al. U.S. Patent 1,623,499, issued April 5, 1927, and Sheppard et al. U.S. Patent 2,410,689, issued November 5, 1946.

The emulsions can also be treated with salts of the noble metals such as ruthenium, rhodium, palladium, iridium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued August 31, 1948, and as antifoggants in higher amounts, as described in Trivelli and Smith U.S. Patents 2,566,245, issued August 28, 1951 and 2,566,263, issued August 28, 1951.

The emulsions can also be chemically sensitized with gold salts as described in Waller et al. U.S. Patent 2,399,083, issued April 23, 1946, and Damschroder et al. U.S. Patent 2,642,361, issued June 16, 1953. Suitable compounds are potassium chloroaurite, potassium aurithiocyanate, potassium chloroaurate, auric trichloride and 2-aurosulfobenzothiazole methochloride.

The emulsions can also be optically sensitized with cyanine and merocyanine dyes, such as those described in Brooker U.S. Patents 1,846,301, issued February 23, 1932; 1,846,302, issued February 23, 1932; and 1,942,854, issued January 9, 1934; White U.S. Patent 1,990,507, issued February 12, 1935; Brooker and White U.S. Patents 2,112,140 issued March 22, 1938; 2,165,338, issued July 11, 1939; 2,493,747 issued January 10, 1950 and 2,739,964, issued March 27, 1956; Brooker and Keyes U.S. Patent 2,493,748, issued January 10, 1950; Sprague U.S. Patents 2,503,776, issued April 11, 1950 and 2,519,001, issued August 15, 1950; Heseltine and Brooker U.S. Patent 2,666,761, issued January 19, 1954; Heseltine U.S. Patent 2,734,900, issued February 14, 1956; VanLare U.S. Patent 2,739,149, issued March 20, 1956; and Kodak Limited British Patent 450,958, accepted July 15, 1936.

The emulsions can also be stabilized with the mercury compounds of Allen, Byers and Murray U.S. Patent 2,728,663, issued December 27, 1955; Carroll and Murray U.S. Patent 2,728,664, issued December 27, 1955; and Leubner and Murray U.S. Patent 2,728,665, issued December 27, 1955; or with gold salts as described in Damschroder U.S. Patent 2,597,856, issued May 27, 1952, and Yutzy and Leermakers U.S. Patent 2,597,915, issued May 27, 1952; the triazoles of Heimbach and Kelly U.S. Patent 2,444,608, issued July 6, 1948; the azaindenes of Heimbach and Kelly U.S. Patents 2,444,605 and 2,444,606, issued July 6, 1948; Heimbach U.S. Patents 2,444,607, issued July 6, 1948 and 2,450,397, issued September 28, 1948; Heimbach and Clark U.S. Patent 2,444,609, issued July 6, 1948; Allen and Reynolds U.S. Patents 2,713,541, issued July 19, 1955 and 2,743,181, issued April 24, 1956; Carroll and Beach U.S. Patent 2,716,062, issued August 23, 1955; Allen and Beilfuss U.S. Patent 2,735,769, issued February 21, 1956; Reynolds and Sagal U.S. Patent 2,756,147, issued July 24, 1956; Allen and Sagura U.S. Patent 2,772,164, issued November 27, 1956, and those disclosed by Birr in "Z. wiss. Phot.," vol. 47, 1952, pages 2–28; the disulfides of Kodak Belgian Patent 569,317, issued July 31, 1958; the quaternary benzothiazolium compounds of Brooker and Staud U.S. Patent 2,131,038, issued September 27, 1938 or the polymethylene bis-benzothiazolium salts of Allen and Wilson U.S. Patent 2,694,716, issued November 16, 1954; the zinc and cadmium salts of Jones U.S. Patent 2,839,405, issued June 17, 1958; and the carboxymethylmercapto compounds of Murray, Reynolds and Van Allan U.S. Patent 2,819,956, issued January 14, 1958.

The emulsions may contain a suitable gelatin plasticizer such as glycerin; a dihydroxy alkane such as 1,5-pentane diol as described in Milton and Murray U.S. Application Serial No. 588,951, filed June 4, 1956 (now U.S. Patent 2,960,404, issued November 15, 1960); an ester of an ethylene bis-glycolic acid such as ethylene bis(methyl glycolate) as described in Milton U.S. Patent 2,904,434, issued September 15, 1959; bis-(ethoxy diethylene glycol) succinate as described in Gray U.S. application Serial No. 604,333, filed August 16, 1956 (now U.S. Patent 2,940,854, issued June 14, 1960), or a polymeric hydrosol as results from the emulsion polymerization of a mixture of an amide of an acid of the acrylic acid series, an acrylic acid ester and a styrene-type compound as described in Tong U.S. Patent 2,852,386, issued September 16, 1958. The plasticizer may be added to the emulsion before or after the addition of a sensitizing dye, if used.

The emulsions may be hardened with a suitable hardener for gelatin which does not react with the other emulsion ingredients.

The emulsions may contain a coating aid such as saponin; a salt of a sulfated and alkylated polyethylene glycol ether as described in Knox and Davis U.S. Patent 2,719,087, issued September 27, 1955; an acylated alkyl taurine such as the sodium salt of N-oleoyl-N-methyl taurine as described in Knox, Twardokus and Davis U.S. Patent 2,739,891, issued March 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,487, issued July 15, 1958; a water-soluble maleopimarate as described in Knox and Fowler U.S. Patent 2,823,123, issued February 11, 1958; an alkali metal salt of a substituted amino acid such as disodium N-(carbo-p-tert. octylphenoxypentaethoxy)-glutamate as described in Knox and Wilson U.S. patent application Serial No. 600,679, filed July 30, 1956 (now U.S. Patent 3,038,804, issued June 12, 1962); or a sulfosuccinamate such as tetrasodium N-(1,2-dicarboxyethyl)-N-octadecyl sulfosuccinamate as described in Knox and Stenberg U.S. patent application Serial No. 691,125, filed October 21, 1957 (now U.S. Patent 2,992,108, issued July 11, 1961), or a sodium salt of an alkylarylpolyether sulfonate of Baldsiefen U.S. Patent 2,600,831, issued June 17, 1952.

The addenda which we have described may be used in various kinds of photographic emulsions. In addition to being useful in X-ray and other nonoptically sensitized emulsions they may also be used in orthochromatic, panchromatic, and infrared sensitive emulsions. They may be added to the emulsion before or after any sensitizing dyes which are used. Various silver salts may be used as the sensitive salt such as silver bromide, silver iodide, silver chloride, or mixed silver halides such as silver chlorobromide or silver bromoiodide. The agents may be used in emulsions intended for color photography, for example, emulsions containing color-forming couplers or emulsions to be developed by solutions containing couplers or other color-generating materials, emulsions of the mixed-packet type, such as described in Godowsky U.S. Patent 2,698,794, issued January 4, 1955; or emulsions of the mixed-grain type, such as described in Carroll and Hanson U.S. Patent 2,592,243, issued April 8, 1952. These agents can also be used in emulsions which form latent images predominantly on the surface of the silver halide crystal or in emulsions which form latent images predominantly inside the silver halide crystal, such as those described in Davey and Knott U.S. Patent 2,592,250, issued April 8, 1952.

These may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued January 29, 1952; 2,698,236, issued December 28, 1954 and 2,543,181, issued February 27, 1951; and Yackel et al. U.S. patent application Serial No. 586,705, filed May 23, 1956 (now U.S. Patent 3,020,155, issued February 6, 1962). They may also be used in color transfer processes which utilize the diffusion transfer of an image-wise distribution of developer, coupler or dye, from a light-sensitive layer to a second layer, while the two layers are in close proximity to one another. Color processes of this type are described in Land U.S. Patents 2,559,643, issued July 10, 1951 and 2,698,798, issued January 4, 1955; Land and Rogers Belgian Patents 554,933 and 554,934, granted August 12, 1957; International Polaroid Belgian Patents 554,212, granted July 16, 1957 and 554,935, granted August 12, 1957; Yutzy U.S. Patent 2,756,142, granted July 24, 1956 and Whitmore and Mader U.S. patent application Serial No. 734,141; filed May 9, 1958 (now abandoned). They may also be used in emulsions intended for use in a monobath process such as described in Haist et al. U.S. Patent 2,875,048, issued February 24, 1959, and in web-type processes, such as the one described in Tregillus et al. U.S. patent application Serial No. 835,473, filed August 24, 1959.

In the preparation of the silver halide dispersions employed for preparing silver halide emulsions, there may be employed as the dispersing agent for the silver halide in its preparation, gelatin or some other colloidal material such as colloidal albumin, a cellulose derivative or a synthetic resin, for instance, a polyvinyl compound. Some colloids which may be used are polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19–26% as described in U.S. Patent 2,327,808 of Lowe and Clark, issued August 24, 1943; a water-soluble ethanolamine cellulose acetate as described in Yutzy U.S. Patent 2,322,085, issued June 15, 1943; a polyacrylamide or an imidized polyacrylamide as described in Lowe, Minsk and Kenyon U.S. Patent 2,541,474, issued February 13, 1951; zein as described in Lowe U.S. Patent 2,563,791, issued August 7, 1951; a vinyl alcohol polymer containing urethane carboxylic acid groups of the type described in Unruh and Smith U.S. Patent 2,768,154, issued October 23, 1956; or containing cyano-acetyl groups such as the vinyl alcohol-vinyl cyanoacetate copolymer as described in Unruh, Smith and Priest U.S. Patent 2,808,331, issued October 1, 1957; or a polymeric material which results from polymerizing a protein or a saturated acylated protein with a monomer having a vinyl group as described in U.S. Patent 2,852,382, of Illingsworth, Dann and Gates, issued September 16, 1958.

If desired, compatible mixtures of two or more of these colloids may be employed for dispersing the silver halide in its preparation. Combinations of these antifoggants, sensitizers, hardeners, etc., may be used.

The following examples will serve to illustrate more fully the manner of sensitizing emulsions according to our invention.

A fast, negative, gelatino-silver-bromiodide emulsion was divided into several aliquot portions and to the separate portions was added one of the alkylene oxide derivatives or aliphatic amines useful in practicing our invention. One emulsion portion containing no aliphatic amine or alkylene oxide derivative served as a control. To another emulsion portion were added both aliphatic amine and alkylene oxide derivative in the amounts given in the following table. The separate portions of emulsion were then digested for a short time and coated on a transparent support, such as cellulose acetate. The coatings were then dried and exposed to a neutral density step-wedge in an intensity scale sensitometer, such as an Eastman Sensitometer Type Ib, for 1/25 second. The strips were then developed for 5 minutes at 68° F. in a developer having the following composition:

DK–50 Developer

Water, about 125° F (50° C.) _____ ccs__ 500
N-methyl-p-aminophenol sulfate _____ grams__ 2.5
Sodium sulfite, desiccated _____ do____ 30.0
Hydroquinone _____ do____ 2.5
Sodium metaborate _____ do____ 10.0
Potassium bromide _____ do____ 0.5
Water to make 1.0 liter.

The coatings were then fixed, washed and dried in the normal manner. The relative speed, gamma and fog for each of the coatings was then determined, where the speed numbers were inversely proportional to the exposure required to produce a density of 0.20 above fog.

Table I

| Coating | Addendum (g./mol.) | Relative Speed | Gamma | Fog |
|---|---|---|---|---|
| (a) | none | 100 | 1.11 | 0.23 |
| (b) | compound 1 (0.15) | 124 | .96 | .23 |
| (c) | oleyl-PEG [1] (0.75) | 155 | .96 | .28 |
| (d) | compound 1 (0.15) plus oleyl-PEG (0.75) | 213 | .91 | .38 |
| (e) | compound 2 (0.15) | 98 | 1.16 | .22 |
| (f) | compound 2 (0.15) plus oleyl-PEG (0.75) | 177 | .98 | .27 |
| (g) | none | 100 | 1.20 | .16 |
| (h) | polyethylene glycol (M.W.=300) (0.75) | 98 | 1.15 | .15 |
| (i) | compound 1 (0.15) | 105 | 1.02 | .17 |
| (j) | compound 1 (0.15) plus polyethylene glycol (M.W.=300) (0.75) | 132 | .95 | .15 |
| (k) | polyethylene glycol (M.W.=600) (0.75) | 105 | 1.19 | .15 |
| (l) | compound 1 (0.15) plus polyethylene glycol (M.W.=600) (0.75) | 120 | 1.00 | .15 |
| (m) | polyethylene glycol (M.W.=1000) (0.75) | 105 | 1.25 | .16 |
| (n) | compound 1 (0.15) plus polyethylene glycol (M.W.=1000) (0.75) | 120 | 1.00 | .15 |
| (o) | none | 100 | 1.12 | .22 |
| (p) | oleyl-PEG (0.75) | 150 | .91 | .24 |
| (q) | compound 4 (0.15) | 112 | .92 | .26 |
| (r) | compound 4 (0.15) plus oleyl-PEG (0.75) | 180 | 1.05 | .26 |
| (s) | compound 5 (0.15) | 126 | .94 | .22 |
| (t) | compound 5 (0.15) plus oleyl-PEG (0.75) | 186 | 1.00 | .24 |
| (u) | compound 6 (0.15) | 124 | 1.07 | .20 |
| (v) | compound 6 (0.15) plus oleyl-PEG (0.75) | 186 | | .23 |
| (w) | compound 6 (0.45) plus oleyl-PEG (0.75) | 213 | 1.09 | .29 |

[1] Oleyl-PEG = condensation product of about 15 moles of ethylene oxide with one mole of oleyl alcohol.

In a manner similar to that illustrated in the above table, other aliphatic amines can be used in synergistic combination with the alkylene oxide derivatives of our invention, particularly derivatives of ethylene oxide. Our invention is particularly useful in those cases where the aliphatic amine is a primary, secondary or tertiary monoamine. Certain diamines, such as 2-di-n-propylaminoethylamine, γ-diethylaminopropylamine, etc., which contain a total of seven or more carbon atoms, can also be used to produce a synergistic effect.

The photographic silver halide emulsions of our invention can be coated on any of the conventional photographic supports, such as metal, glass, paper, cellulose acetate film, polyvinyl acetal resin film, polystyrene film, polyethylene terphthalate film, etc.

It has also been found that some speed increases can be obtained by incorporating the alkylene oxide polymer in the photographic developer, while the aliphatic amines of our invention are incorporated in the photographic emulsions.

The amount of aliphatic amine used in sensitizing the photographic silver halide emulsions of our invention can be varied, although we have found that generally from about 0.05 to 2.0 grams per mole of silver halide are particularly useful. In like manner, the amount of alkylene oxide polymer can be varied, although we have found that generally from about 0.05 to 5.0 grams per mole of silver halide are particularly useful for incorporation in the emulsions. When the alkylene oxide polymer is incorporated in the developer, considerably larger quantities can be employed. The ratio of alkylene oxide polymer to aliphatic amine can vary considerably, although we have found that a molar ratio of about 1:1 to 25:1 can be used to advantage.

The invention has been described in detail with particular reference to preferred embodiments thereof, but it will be understood that variations and modifications can be effected within the spirit and scope of the invention as described hereinabove and as defined in the appended claims.

What we claim and desire secured by Letters Patent of the United States of America is:

1. A photographic silver halide emulsion sensitized with from 0.05 to 5.0 grams per mole of silver halide of (a) an alkylene oxide polymer selected from the class consisting of (1) a polyalkylene glycol and (2) a condensation product of an alkylene oxide with an organic compound containing an active hydrogen atom, said alkylene oxide containing from 2 to 4 carbon atoms and said alkylene oxide polymer having a molecular weight of at least 300, and from 0.05 to 2.0 grams per mole of silver halide of (b) an aliphatic amine selected from those represented by the following general formula:

wherein R represents a member selected from the class consisting of an alkyl group containing from 6 to 20 carbon atoms and an alkenyl group containing from 6 to 18 carbon atoms, and $R_1$ and $R_2$ each represents a member selected from the class consisting of a hydrogen atom, an alkyl group containing from 1 to 8 carbon atoms, a hydroxyalkyl group containing from 2 to 3 carbon atoms, an alkoxyalkyl group containing from 3 to 4 carbon atoms and a halogenoalkyl group containing from 2 to 3 carbon atoms, the molar ratio of alkylene oxide polymer to aliphatic amine being from about 1:1 to 25:1.

2. A photographic silver halide emulsion sensitized with from 0.05 to 5.0 grams per mole of silver halide of (a) an ethylene oxide polymer selected from the class consisting of (1) a polyethylene glycol and (2) a condensation product of ethylene oxide with an organic compound containing an active hydrogen atom, said ethylene oxide polymer having a molecular weight of at least 300, and from 0.05 to 2.0 grams per mole of silver halide of (b) an aliphatic amine selected from those represented by the following general formula:

wherein R represents a member selected from the class consisting of an alkyl group containing from 6 to 20 carbon atoms and an alkenyl group containing from 6 to 18 carbon atoms, and $R_1$ and $R_2$ each represents a member selected from the class consisting of a hydrogen atom, an alkyl group containing from 1 to 8 carbon atoms, a hydroxyalkyl group containing from 2 to 3 carbon atoms, an alkoxyalkyl group containing from 3 to 4 carbon atoms and a halogenoalkyl group containing from 2 to 3 carbon atoms, the molar ratio of ethylene oxide polymer to aliphatic amine being from about 1:1 to 25:1.

3. A photographic silver halide emulsion as defined in claim 2 wherein said silver halide is silver bromiodide.

4. A photographic silver halide emulsion as defined in claim 2 wherein said silver halide emulsion is additionally sensitized with a labile sulfur compound and a gold salt.

5. A photographic silver halide emulsion sensitized with from 0.05 to 5.0 grams per mole of silver halide of (a) the oleyl ether of a polyethylene glycol and from 0.05 to 2.0 grams per mole of silver halide of (b) an aliphatic amine selected from those represented by the following general formula:

where R represents a member selected from the class consisting of an alkyl group containing from 6 to 20 carbon atoms and an alkenyl group containing from 6 to 18 carbon atoms, and $R_1$ and $R_2$ each represents a member selected from the class consisting of a hydrogen atom, an alkyl group containing from 1 to 8 carbon atoms, a hydroxyalkyl group containing from 2 to 3 carbon atoms, an alkoxyalkyl group containing from 3 to 4 carbon atoms and a halogenoalkyl group containing from 2 to 3 carbon atoms, the molar ratio of the oleyl ether to aliphatic amine being from about 1:1 to 25:1.

6. A photographic silver halide emulsion sensitized according to claim 1 with (a) the oleyl ether of polyethylene glycol and (b) N-methylmyristylamine.

7. A photographic silver halide emulsion sensitized according to claim 1 with (a) the oleyl ether of polyethylene glycol and (b) N-methylmyristyl-β-hydroxyethylamine.

8. A photographic silver halide emulsion sensitized according to claim 1 with (a) a polyethylene glycol and (b) N-methylmyristylamine.

9. A photographic silver halide emulsion sensitized according to claim 1 with (a) the oleyl ether of polyethylene glycol and (b) laurylmethylamine.

10. A photographic silver halide emulsion sensitized according to claim 1 with (a) the oleyl ether of polyethylene glycol and (b) methyloctadecen-9-ylamine.

References Cited in the file of this patent
UNITED STATES PATENTS

| | | |
|---|---|---|
| 1,925,508 | Staud et al. | Sept. 5, 1933 |
| 2,016,471 | Williams et al. | Oct. 8, 1935 |
| 2,708,162 | Carroll et al. | May 10, 1955 |
| 2,743,182 | Lowe et al. | Apr. 24, 1956 |
| 2,886,437 | Piper | May 12, 1959 |

FOREIGN PATENTS

| | | |
|---|---|---|
| 923,891 | Germany | Feb. 21, 1955 |

OTHER REFERENCES

Fieser et al.: "Organic Chemistry," Third Ed., 227–8, Reinhold Publishing Co., New York (1956).